(12) United States Patent
Challener et al.

(10) Patent No.: US 7,484,241 B2
(45) Date of Patent: Jan. 27, 2009

(54) SECURE SINGLE SIGN-ON TO OPERATING SYSTEM VIA POWER-ON PASSWORD

(75) Inventors: David Carroll Challener, Raleigh, NC (US); Steven Dale Goodman, Raleigh, NC (US); James Patrick Hoff, Raleigh, NC (US); David Rivera, Durham, NC (US); Randall Scott Springfield, Chapell Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 844 days.

(21) Appl. No.: 10/994,620

(22) Filed: Nov. 22, 2004

(65) Prior Publication Data

US 2006/0112420 A1    May 25, 2006

(51) Int. Cl.
G06F 7/04 (2006.01)
H04L 9/32 (2006.01)
(52) U.S. Cl. .......................... 726/5; 713/193
(58) Field of Classification Search ........... 726/8
See application file for complete search history.

(56) References Cited

U.S. PATENT DOCUMENTS

| | | | |
|---|---|---|---|
| 5,983,273 A | 11/1999 | White et al. | |
| 6,125,457 A | 9/2000 | Crisan et al. | |
| 6,178,511 B1 | 1/2001 | Cohen et al. | |
| 6,240,512 B1 | 5/2001 | Fang et al. | |
| 6,243,816 B1 | 6/2001 | Fang et al. | |
| 2003/0188179 A1* | 10/2003 | Challener et al. | 713/193 |
| 2003/0195970 A1 | 10/2003 | Dinh et al. | |

OTHER PUBLICATIONS

Divyangi Anchan et al., "Regaining Single Sign-On Taming the Beast," SIGUCCS, Sep. 21-24, 2003, San Antonio, Texas, USA, 2003, pp. 166-171.
Birgit Pfitzmann et al., "Privacy in Browser-Based Attribute Exchange," WPES, Nov. 21, 2002, Washington, D.C., USA, 2002, pp. 52-62.

* cited by examiner

*Primary Examiner*—Brandon S Hoffman
(74) *Attorney, Agent, or Firm*—Carlos Munoz-Bustamante; Schubert Osterrieder & Nickelson PLLC (57) ABSTRACT

Methods and arrangements are disclosed for secure single sign on to an operating system using only a power-on password. In many embodiments modified BIOS code prompts for, receives and verifies the power-on password. The power-on password is hashed and stored in a Platform Configuration Register of the Trusted Platform Module. In a setup mode, the trusted platform module encrypts the operating system password using the hashed power-on password. In a logon mode, the trusted platform module decrypts the operating system password using the hashed power-on password.

17 Claims, 4 Drawing Sheets

SECURE SINGLE SIGN-ON TO OPERATING SYSTEM VIA POWER-ON PASSWORD

FIELD OF INVENTION

The present invention is in the field of secure single sign-on passwords. More particularly, the invention is in the field of reducing the number of times a user must enter a password.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, facsimile, and a growing list of simulation, modeling, analysis and tracking functions.

For example, businesses often employ a wide variety of computing applications to support critical work activities such as accounting, customer support, engineering and sales. Government entities often use computers to track statistical and project data. Individuals and families often use computers for word processing, homework, research, telecommuting, games, news, stock market information and trading, banking, shopping, shipping, communication in the form of Voice over Internet protocol (VoIP) and email, as well as many other activities. In fact, for millions of businesses and individuals, computers represent an essential tool for their livelihood. Corresponding to their variety of uses, computers are physically located in a wide variety of locations, including physically secure buildings, the home office, trains, airplane terminals, etc. Users transport mobile PCs such as laptop computers over distances into and out of unsecured areas.

Because of the utility and widespread use of computers, one of the prominent features of computers is the creation, storage and use of digital data. The vast majority of computer programs create, store and use digital data as part of their functioning. The nature of this data can be trivial, say related to a video game, or alternatively the data can be essential trade secret business information whose value to its owner far outweighs the value of the computer that contains it. Many computers store most of their non-volatile data as hard-files on hard disk drives (HDDs). For example, users of business computers, including laptop computers in particular, containing valuable stored data are transported to many different locations outside of the more secure confines of the business environment. In this manner, users carry valuable and confidential data store in computers to unsecured areas where they are more likely to be lost or stolen.

Thus, computer systems store and transfer large amounts of confidential information. To protect this information, systems, software applications, and databases currently offer password protection, leading to many users being responsible for a large and increasing number of passwords. To use these systems and applications, the user must issue separate sign-on commands for each specific system or application. Indeed, a user may encounter ten or more different login sessions during a working shift, and these often are different interfaces with different user ID and authentication information, usually passwords. This places the user under a significant burden to remember passwords and other authentication.

As the number of software applications and their associated passwords proliferate, so does the difficulty for the users to keep track of all those passwords. To manage those passwords some users select the same password, or a small set of passwords, using the same password for different applications, databases and systems. Often the user will choose a password that is simple to remember. Some users keep their passwords written in an unprotected file on the very computer they seek to protect. An unauthorized person may therefore discover or guess a user's password and gain access to the user's information and software. Further, even simple passwords are forgotten through infrequent use. When the user forgets a password, he or she must retrieve it from a written source, or a system administrator may have to reset the password. If this is not possible, the information associated with the password is lost.

The loss of password-protected data can have a significant, negative impact on the owner or user of that data. For example, original business data accumulated at considerable expense that becomes lost may require a second expenditure of finds and efforts to recreate that data. For this reason, computer owners such as businesses often avoid password protection of data, especially hard disk drive data, to avoid costly losses, thereby defeating the entire password-protection scheme for HDDs and other storage devices. Indeed, software applications frequently give the user the opportunity to store the chosen password and to "remember" it next time the user logs on to the application. This too defeats security.

Methods called Single Sign-On (SSO) or Secure Single Sign-On (SSSO) enable a user to logon to a host of applications, systems, and databases using a single password. A single sign-on system should provide secure storage of user passwords, support for more than one user password, as well as support for multiple target logon methods. One approach is to encrypt a password and use it to gain access to all the user's systems and applications. This weakens system security. If an unauthorized person discovers the password, he or she obtains access to all the information, systems and applications covered by the password.

Further, different programs and systems have their own distinctive password requirements. It is problematic therefore to use the same password for multiple targets. A more limited approach seeks to reduce the number of passwords a user must remember without using a single password for all user information, applications and systems. Thus, there is a need to reduce the number of passwords that a user of a computer system must remember and enter while providing password security.

SUMMARY OF THE INVENTION

The present invention provides a method for securely reducing the number of passwords that a user of a computer system must remember and enter. More specifically, the present invention enables automatic logon of an operating system by entering only the computer system's power-on password.

According to one aspect of the invention, a computer system with a Trusted Platform Module (TPM) comprises software that enables the user to securely logon to an operating system using only the computer system's power-on password. In a setup mode, the code causes the TPM to encode the power-on password. The code then causes the TPM to encrypt the operating system password using the encoded power-on password. The code then causes the encrypted software program password to be stored on the computer-system's hard drive or in other non-volatile memory.

In a subsequent logon mode, after the user has successfully entered the computer system's power-on password, the code causes the TPM to encode the user-entered power on password. The code then causes retrieval of the encrypted operating system password from the hard drive or other non-volatile memory. Next, the code causes the TPM to decrypt the operating system's password, which is then used to log the user on to the operating system. Thus, the method provides for securely signing on to an operating system using only a power-on password.

According to another aspect of the invention, a Platform Configuration Register (PCR) of a TPM stores the encoded power-on password. The TPM encodes the power-on password by hashing it. In the setup process, the TPM seals, (encrypts), the operating system password using the hashed power-on password. In the normal logon mode of operation, the TPM unseals, (decrypts), the operating system password using the hashed power-on password.

According to yet another aspect of the invention, a Platform Configuration Register of the TPM stores a value indicating the state of the operating system. Both the encryption and decryption processes use the value stored in the register. If the operating system is not in the same state at the time of decryption as it was at the time of encryption then decryption will fail.

Thus, in a setup mode the TPM encodes the power-on password and uses it to encrypt the operating system password. In a logon mode, the user enters the computer system's power on password, which the TPM encodes and stores. The TPM then decrypts the operating system password which is then used to logon to the operating system.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments but, on the contrary, the intention is to cover all modifications, equivalents, and alternatives falling within the spirit and scope of the present invention as defined by the appended claims. The detailed descriptions below make such embodiments obvious to a person of ordinary skill in the art.

Figure 1:
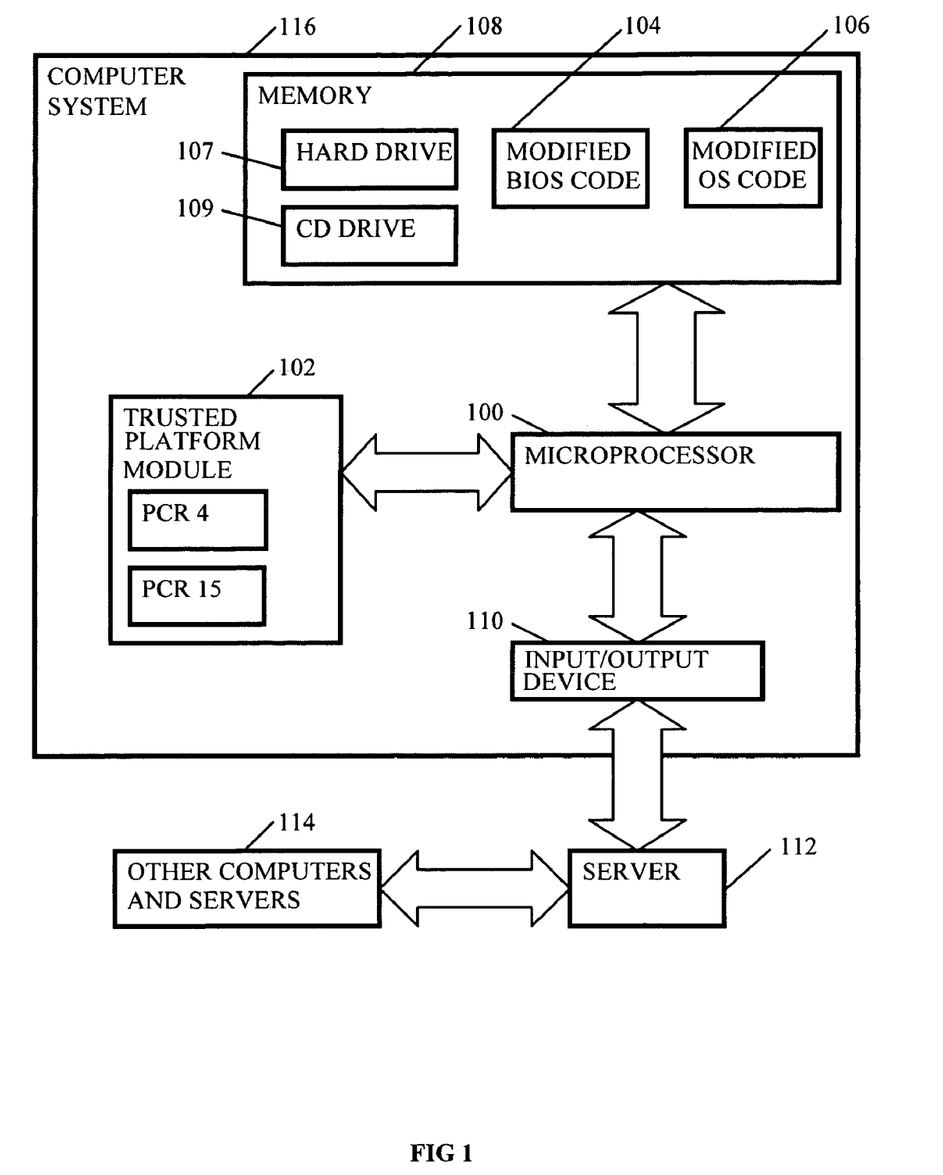
FIG. 1 depicts an embodiment of the invention including modified BIOS code and Operating System Extension code operating in conjunction with a processor and a Trusted Platform Module.

FIG. 1 shows a computer system 116 implemented according to an embodiment of the present invention. Computer system 116 comprises a processor 100 operating in conjunction with a Trusted Platform Module (TPM) 102. Processor 100 operates according to Modified BIOS Code 104 and Operating System (OS) Extension Code 106. The modified BIOS code is stored on Read-Only Memory (ROM) and the OS Extension code is stored on the hard drive of computer system 116.

Computer system 116 also typically includes other components and subsystems not shown, such as: memory controllers, random access memory (RAM), peripheral drivers, a system monitor, a keyboard, a system monitor, one or more flexible diskette drives, one or more removable non-volatile media drives such as a fixed disk hard drive 107, CD and DVD drives 109, a pointing device such as a mouse, and an network interface adapter, etc. Computer systems 116 may include personal computers, workstations, servers, mainframe computers, notebook or laptop computers, desktop computers, or the like.

Processor 100 communicates with TPM 102 to transfer data and commands. Processor 100 may also communicate with a server 112 by way of Input/Output Device 110. Server 112 connects computer system 116 with other computers and servers 114. Thus, computer system 116 is in a network of computers such as the internet and/or a local intranet.

The TPM 102 is a microcontroller that protects cryptographic keys, which provides for enhanced security of passwords and digital certificates. It typically affixes to the motherboard of a PC, but incorporates into any system where security is required. The main chip contains a special security controller with some internal, non-volatile ROM for the firmware, and non-volatile EEPROM for the data and RAM. Furthermore, it contains a cryptographic engine for performing encryption and decryption processes and hashing and a random number generator (needed to generate secure cryptographic keys).

The TPM offers protected storage, platform authentication, protected cryptographic processes and attestable state capabilities to provide the first level of trust for the computing platform. The foundation of this trust is the certification by a recognized authority that the platform can be trusted for an intended purpose. The Trusted Computing Group (TCG), a standards-setting entity, has defined and published a specification to enable trust and security capabilities on computing platforms in general. They define a trusted subsystem that can be integrated into every computing platform in order to build a secure computing base. The functions defined by the TCG are integrated into the TPM, which can be compared to an integrated smart card containing a CPU, some memory and special applications.

In addition to the hardware described above, the TPM 102 also comprises Platform Configuration Registers (PCR), each register capable of storing a block of data. The registers store particular information. For example, PCR 4 stores a block of data corresponding to the state of the operating system. In the embodiment shown in FIG. 1, PCR 15 stores a block of data corresponding to the authenticated power-on password, as will be explained subsequently.

When the system powers on, modified BIOS code 14 is loaded from memory 108 and executed by processor 100. Modified BIOS code 104 includes executable instructions for performing a number of functions essential to computer start up and further includes executable instructions for setting up and authenticating a power-on password (POP). Modified BIOS code 104 also includes executable instructions for causing the TPM 102 to encode the POP. The encoded POP is stored in PCR 15 of TPM 102.

OS Extension code 106 includes executable instructions for enhancing the logon capabilities of the operating system. A software program is written to provide executable instructions to cause the TPM 102 to encrypt the OS password. OS Extension code 106 is further modified to provide executable instructions for executing an operating system logon process. The logon process includes decrypting the encrypted OS password. Upon proper authentication, processor 100 continues to execute its operating system code.

The system 116 operates in a setup mode to enable automatic logon to the operating system when the user enters the POP. Prior to executing a setup mode, to be described below, the user must enter a POP and an OS password. When computer system 116 powers on, modified BIOS code 104 causes the user to be prompted for the POP. The user enters the POP. The modified BIOS code 104 verifies the user-entered POP using means known in the art. If the POP is correct, the user is prompted by OS Extension code 106 for the OS password. The user enters the OS password and the operating system verifies it. If the OS password is correct, the user is logged onto the operating system.

Once the operating system is running, the operating system displays a Single Sign-On setup icon. The user points and clicks on the icon with the mouse and the operating system enters the setup mode. In the setup mode, the user is again prompted for the POP and the OS password and these passwords are validated using means known in the art as described below. The setup software running under the OS then causes the TPM 102 to encode the POP and store the encoded POP in PCR 15. The OS code then causes TPM 102 to encrypt the OS password using the encoded POP. The setup software then stores the encrypted OS password on hard drive 107 or other storage device 109.

After setup, when the system is next powered-on, modified BIOS code 104 prompts the user to enter the POP. The user enters the POP, and modified BIOS code 104 validates and encodes it and stores the encoded POP in PCR 15. The operating system extension code then retrieves the encrypted password and causes TPM 102 to decrypt it using the encoded POP stored in PCR 15. The operating system then logs the user onto the operating system using the decrypted OS password. Thus, after setup, the user need only enter the POP to log onto the operating system.

Figure 1A:
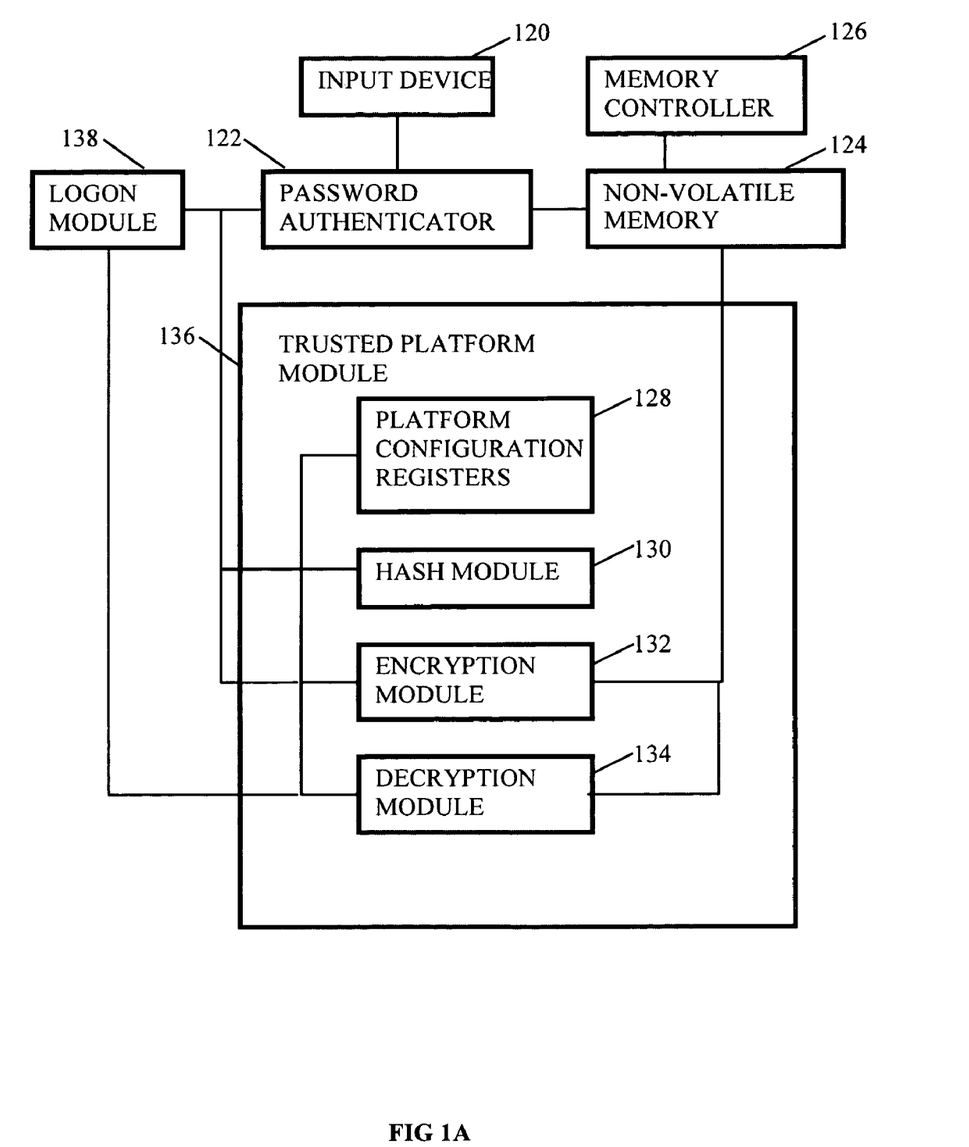
FIG. 1A depicts an embodiment of an apparatus of the present invention.

FIG. 1A shows an embodiment of an apparatus of the present invention. An input device 120 enables a user to enter passwords. Password authenticator 122 receives and authenticates passwords the user enters via input device 120. Password authenticator 122 authenticates the user-entered password by comparing it to a value received from non-volatile memory storage 124 operating under the control of memory controller 126. Logon module 138 may receive the authenticated password from authenticator 122 and use it to logon to the operating system, application program, or other system.

Trusted Platform Module 136 is in electrical communication with non-volatile storage 124 to retrieve and store encrypted passwords. Trusted Platform Module 136 is also in electrical communication with password authenticator 122 to receive the user entered power-on password. Hash module 130 receives the user-entered power-on password from authenticator 122, hashes it, and stores it in one of platform configuration registers 128. Encryption module 132 encrypts the user-entered program password received from authenticator 122. Decryption module 134 decrypts the program password received from non-volatile storage 124. Logon module 138 receives the decrypted program password and uses it to logon to the program.

Figure 2:
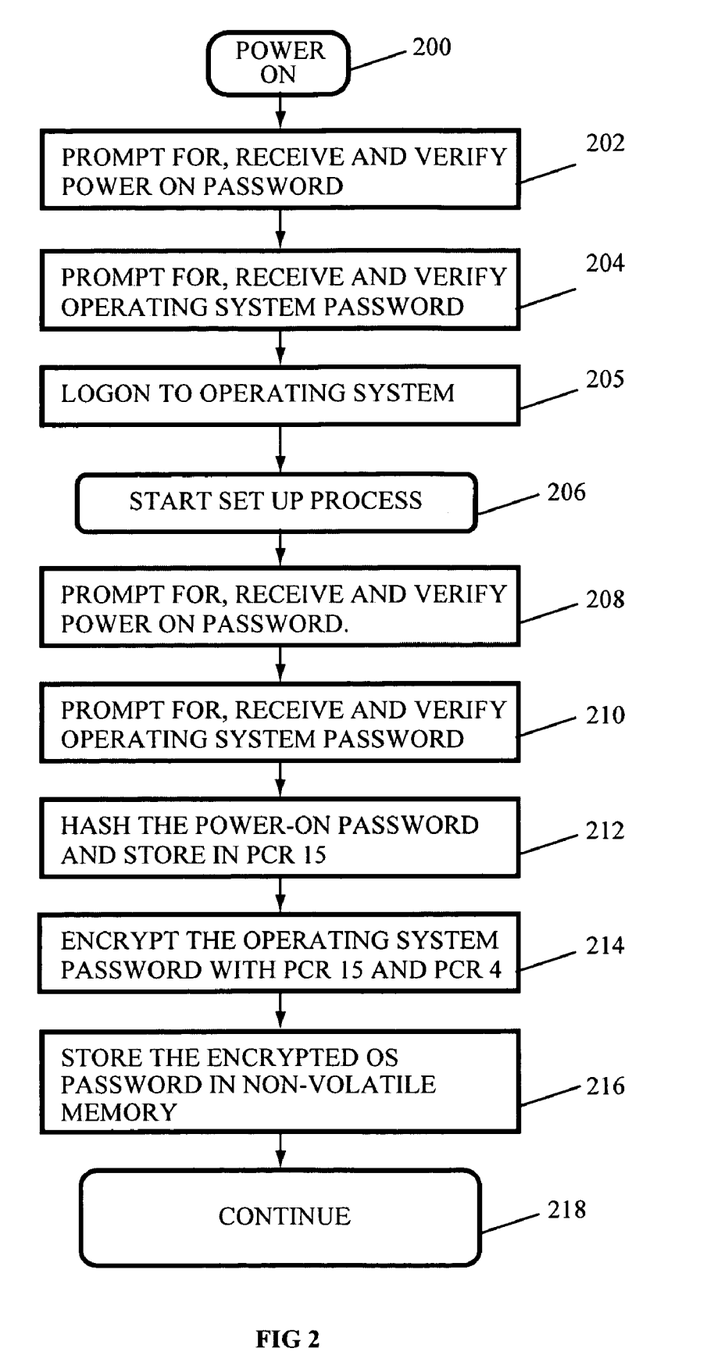
FIG. 2 depicts an example of a flow chart showing operation of an embodiment of the invention; the figure shows the setup operation for encrypting the operating system password.

FIG. 2 shows a flowchart of the Setup Process according to an embodiment of the invention. When the user powers on the system (element 200) the modified BIOS prompts the user for the POP. The user enters the POP and the modified BIOS validates it, (element 202). The password is validated using means known in the art. Next, the operating system prompts the user for the OS password. The user enters the OS password and the operating system validates it (element 204). The OS password is validated using means known in the art.

One means for password verification involves "hashing" the password. This means that the password is mapped by way of a one-way mathematical function to a block of data. The mathematical function has no one-to-one inverse, so one cannot retrieve the password from the block of data. Stated another way, the function produces data that cannot be decrypted. In this method of password verification, the system hashes the user-entered password and compares it to the hash of the actual password. The actual password is not stored. Unless the hash of the user-entered password matches the stored hash, logon will not occur.

Once the modified BIOS verifies the POP and the operating system verifies the OS password, the user is logged onto the operating system (element 205). The operating system displays an icon upon which the user may point and click with the mouse. To execute the setup process the user clicks on the icon (element 206). A window opens and the setup program prompts the user to enter the POP (element 208). The setup program then invokes the modified BIOS to validate the user-entered POP (element 208) using, for example, a BIOS SMI call. The BIOS SMI is an interface that passes the entered password, or data corresponding to that password, to a memory location where BIOS code evaluates it to determine if it is valid. The setup program then prompts the user to enter the OS password (element 210). The operating system then validates the OS password (element 210).

Next, the setup program causes the verified POP to be "hashed" by the TPM using the TPM Extend command to PCR 15 (element 212). This means that a one-way mathematical function maps the password to an undecryptable block of data that is stored in Platform Configuration Register 15.

The setup program causes the TPM-to encrypt the OS password 214 using the TPM Seal Command. The TPM Seal Command causes the TPM 102 to encrypt the verified OS password based on the contents of PCR 15 and PCR 4 (element 214). PCR 15 contains the hashed POP and PCR 4 stores a sequence that indicates the state of the operating system. The result of the encryption is a block of data representative of the OS password. This encrypted data is stored on the hard drive of the computer system (element 216). Alternatively, the encrypted password can be stored on other non-volatile storage, such as a compact disc or memory key. This completes the setup process (element 218) and the operating system continues its normal functions.

The TPM Seal operation seals (encrypts) data, based on the platform configuration values that are stored in the specified platform configuration registers. The encrypted result of the TPM Seal operation is referred to in the art as a blob. To unseal (decrypt) the blob, the appropriate key must be available for unseal, and the value of the PCRs must be the same at the time of Unseal as the value existing at the time of the Seal. Specifying PCR 4 ensures the system is in a trusted configuration for the decryption to occur.

Figure 3:
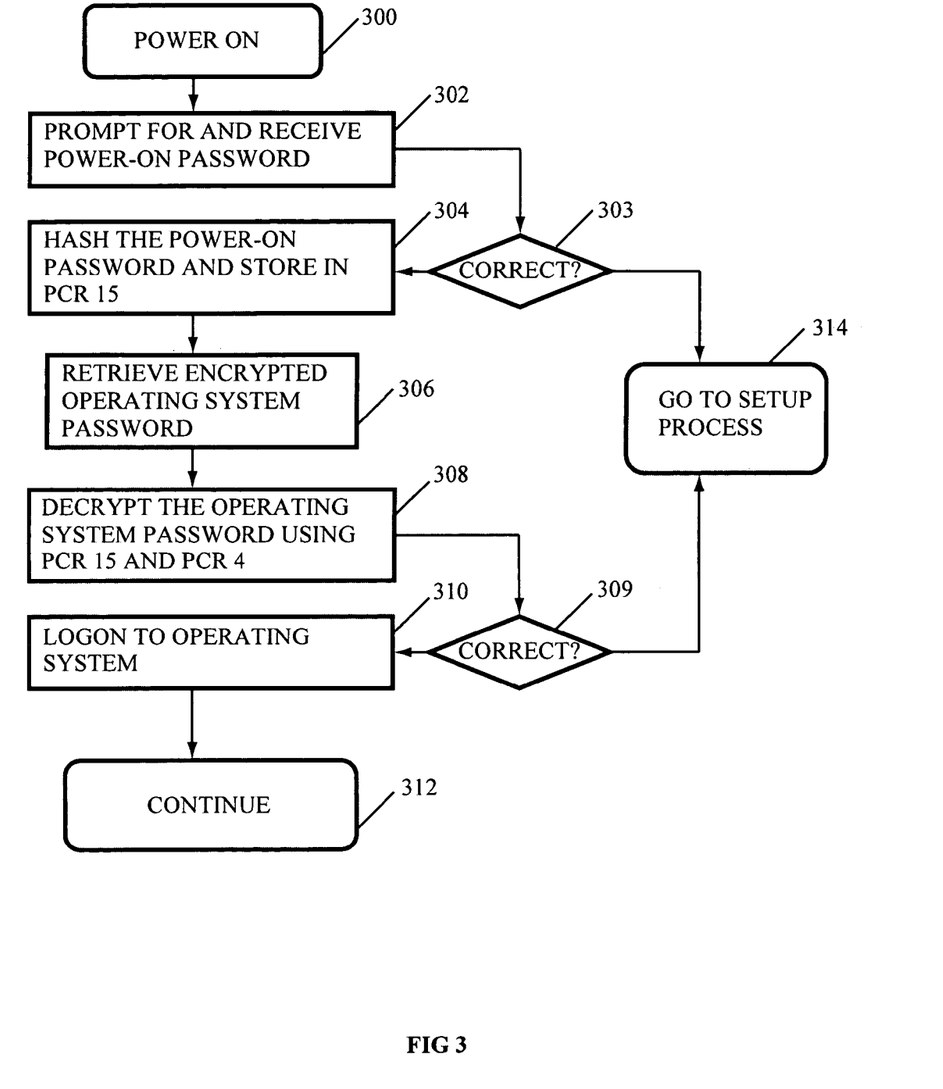
FIG. 3 depicts an example of a flow chart showing operation of an embodiment of the invention; the figure shows the logon process for decrypting the operating system password and logging on to the operating system.

FIG. 3 shows a flow chart of the normal usage logon process of the present invention. The modified BIOS prompts the user for the POP (element 302), when the system powers on (element 300). The modified BIOS verifies the user-entered POP (element 303). If the entered password is not correct, the user cannot boot the computer (element 314). Thus, if a system administrator has changed the POP, the user must obtain the new password from the system administrator.

If the entered password is correct, then the modified BIOS causes TPM 102 to hash the POP and store it in PCR 15 (element 304). More specifically, the modified BIOS issues a TPM Extend command to extend the POP to PCR 15. The operating system extension code then retrieves the encrypted OS password from the hard drive or other media where the operating system previously stored it (element 306). The operating system extension code then causes the TPM 102 to decrypt the retrieved encrypted password, using the contents of PCR 15 and PCR 4 (element 308).

If the contents of PCR 4 and PCR 15 at the time of decryption are not the same as the contents of PCR 4 and PCR 15 at the time of encryption, then decryption will fail to issue the correct OS password. When this occurs, the operating system's attempt to validate the decryption result (element 309), will fail and the user must manually enter the OS password, after which the setup process must be executed again (element 314). If the contents of PCRs 4 and 15 at the time of decryption are the same as the contents of PCRs 4 and 15 at the time of encryption, then decryption using the verified POP will be successful. Then, the operating system will logon (element 310) and continue its operations (element 312).

Only a valid POP will unseal the OS password. Thus, if the system administrator has changed the POP, the user must obtain the new POP from the administrator. Upon re-execution of the setup process using the new POP, a new blob is stored, and subsequent logons to the operating system will automatically occur when the user enters the POP.

Note that the present invention requires no new hardware in a system equipped with a Trusted Platform Module, as is increasingly the case. Rather, only the BIOS code and OS extension code is modified. The BIOS code is modified to invoke the TPM Extend function of the TPM. The OS Extension code is modified to execute the setup process and, during logon, to retrieve the encrypted OS Password, and to decrypt the blob.

As noted, the state of the operating system is stored in PCR 4. Only if the operating system is in the correct state will the OS password be unsealed. Thus, the method provides an additional measure of security, preventing unauthorized use of the data by some other boot source. The result of the unseal operation is the OS password, which is used to logon to the operating system. The system overwrites the data in PCR 15 once used to decrypt the OS password. This prevents unauthorized use of the hashed POP, providing yet another measure of security.

Note that one can implement the method of the present invention in any operating system. For example, in a Microsoft Windows environment, the above-described logon process would be located in the Graphical Identification and Authentication (GINA) interface. Because the present invention enables the user to use one less password to log on to a system, inability to log on due to a forgotten password occurs less often. This means fewer telephone calls to the system administrator or the help desk for forgotten passwords.

Thus, the present invention reduces the number of passwords a user must remember without using a single password for all user information, applications and systems. This is done while maintaining the security of the POP, and the operating system covered by the password. Because the POP is hashed, and the operating system password is encrypted and decrypted, using the Trusted Platform Module, the method of the present invention provides a high level of trust. The present invention needs no new hardware for a system with a Trusted Platform Module. Only software needs modification to implement the present invention.

Some embodiments of the invention are implemented as a program product for use with a computer system such as, for example, the system 116 shown in FIG. 1. The program product could be used on other computer systems or processors. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Thus, another embodiment of the invention provides a machine-accessible medium containing instructions effective, when executing in a data processing system, to cause the system to perform a series of operations for logging on to an operating system using a power-on-password. The series of operations generally include receiving a first password and encoding it. Encoding the first password may comprise hashing it. The operations further include storing the encoded first password in a Platform Configuration Register of the Trusted Platform Module; retrieving from non-volatile storage an encrypted program password; decrypting the encrypted program password based upon the encoded first password via the Trusted Platform Module; and logging on to the program with the program password.

The series of operations generally include operating in a setup mode to encrypt the operating system password. The setup mode operations include receiving the first password; encoding the first password and storing the encoded first password in the Trusted Platform Module; encrypting the program password in the Trusted Platform Module based upon the encoded, first password; and storing the encrypted program password in non-volatile memory. Other operations include verifying a current state of an operating system during decryption of the encrypted program password to prevent decryption of the encrypted program password if the current state is different from a previous state of the operating system during encryption of the program password.

Although the present invention and its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to securely logon an operating system using a power on password, the method comprising:
   receiving by a computer a power on password from a user;
   verifying the power on password received from the user;
   encoding the power on password and storing the encoded power on password in a first Platform Configuration Register (PCR) of a Trusted Platform Module (TPM) of the computer;
   retrieving from non-volatile storage an encrypted operating system password;
   recovering the operating system password by decrypting the encrypted operating system password using the encoded power on password from the user and using the contents of a second PCR having data indicative of a state of the computer on the Trusted Platform Module, such that the operating system password is recovered only if the contents of the first and second PCRs are the same as values used to encrypt the encrypted operating system password; and
   logging on the operating system with the recovered operating system password.

2. The method of claim 1, further comprising:
   receiving a new power on password;
   encoding the new power on password and storing the encoded, new power on password in the first PCR of the trusted platform module;
   encrypting a new operating system password in the trusted platform module using the encoded, new power on password and using contents of the second PCR that contains data indicative of a state of the computer; and
   storing the encrypted new operating system password in non-volatile memory.

3. The method of claim 1, wherein encoding the power on password comprises hashing the power on password.

4. The method of claim 1, wherein retrieving from non-volatile memory comprises retrieving the encrypted operating system password from a hard drive.

5. The method of claim 1, wherein retrieving from non-volatile memory comprises retrieving the encrypted, operating system password from a removable compact disk.

6. A secure single sign on method for logging on an operating system of a computer using a power on password, the method comprising:
   prompting a user by a BIOS to enter a power on password;
   receiving a power on password from the user;
   verifying the power on password entered by the user;
   encoding the power on password in a trusted platform module to determine an encoded value;
   storing the encoded value in a platform configuration register of the trusted platform module;
   retrieving an encrypted operating system password from a hard drive;
   decrypting the encrypted, operating system password in the trusted platform module using the encoded value to produce a decrypted, program password, wherein the encrypted program password is decrypted only if the encoded value is the same as a value used to encrypt the operating system password; and
   logging on the operating system using the decrypted, operating system password.

7. The method of claim 6, further comprising encrypting the operating system password in the trusted platform module during a setup process via the encoded value.

8. The method of claim 6, further comprising verifying a current state of the computer during decryption of the encrypted, operating system password to prevent decryption of the encrypted, operating system password if the current state is different from a previous state of the computer during encryption of the operating system password.

9. The method of claim 6, wherein encoding the power on password comprises hashing the power on password and storing the hash of the power on password in a platform configuration register of the trusted platform module.

10. The method of claim 6, wherein decrypting an encrypted, operating system password comprises decrypting the encrypted, operating system password based upon a state of a processor of the computer, the state of the processor indicated by a value stored in a platform configuration register of the trusted platform module.

11. An apparatus for logging on an operating system of a computer using a power on password entered by a user, the apparatus comprising:
   a non-volatile memory to store an encrypted operating system password;
   a password authenticator to authenticate the power on password entered by the user;
   a trusted platform module coupled with the password authenticator to receive the power on password after authentication; to encode the power on password; to store the encoded power on password in a platform configuration register of the trusted platform module; and to decrypt the encrypted operating system password stored in non-volatile memory using the encoded power on password, wherein a decryption of the encrypted operating system password is successful only if the encoded power on password is the same as a value used to encode the operating system password; and
   a logon module to log on the operating system with the decrypted operating system password.

12. The apparatus of claim 11, wherein the trusted platform module comprises an encryption module to encrypt the operating system password using the encoded, power on password.

13. The apparatus of claim 12, wherein the trusted platform module comprises a decryption module to decrypt the encrypted, operating system password based upon a current state of the computer, wherein encryption of the operating system password is based upon a previous state of the computer to prevent decryption of the operating system password if the current state of the computer is different from the previous state.

14. The apparatus of claim 11, wherein the trusted platform module comprises a platform configuration register to store the encoded, power on password.

15. A machine-accessible storage medium containing instructions for logging on to a program using a first password, which, when executed by a machine, cause said machine to perform operations, comprising:

Receiving a power on password from a user;

Verifying the power on password entered by the user;

Encoding the power on password on a trusted platform module of the machine and storing the encoded power on password in a platform configuration register of the trusted platform module;

Receiving from a hard drive onto the trusted platform module an encrypted operating system password;

Decrypting the encrypted operating system password on the trusted platform module using the encoded value of the power on password to produce a decrypted operating system password, wherein the decryption is successful only if the encoded value is the same as a value used to encrypt the operating system password; and Logging on the operating system using the decrypted, program password.

16. The machine-accessible storage medium of claim 15, wherein the operations further comprise decrypting the encrypted operating system password using data dependent upon a state of the machine.

17. The machine-accessible storage medium of claim 16, wherein decrypting the encrypted operating system password using data dependent upon the state of the machine comprises decrypting the encrypted operating system password using a value stored in a platform configuration register of the trusted platform module.

* * * * *